United States Patent [19]

Stubbings

[11] 4,265,156
[45] May 5, 1981

[54] STEEL STOCK CUTTING

[75] Inventor: James H. Stubbings, Rockville, Md.

[73] Assignee: Potomac Applied Mechanics, Inc., Bethesda, Md.

[21] Appl. No.: 62,552

[22] Filed: Jul. 31, 1979

[51] Int. Cl.³ .................. B23D 15/04; B23D 23/00
[52] U.S. Cl. .................................. 83/530; 83/552; 83/694
[58] Field of Search .............. 83/694, 552, 375–390, 83/453, 456, 525, 530, 14, 13, 52, 527, 529, 162–165; 72/325, 326, 331

[56] References Cited

U.S. PATENT DOCUMENTS

| 735,166 | 8/1903 | Smith | 83/588 |
|---|---|---|---|
| 1,033,527 | 7/1912 | Bradshaw | 83/588 X |
| 2,039,847 | 5/1936 | Howland-Shearman | 83/387 |
| 2,439,029 | 4/1948 | Welk | 83/530 X |
| 2,884,063 | 4/1959 | Stover | 83/694 X |
| 3,227,022 | 1/1966 | Evans et al. | 83/529 |
| 3,362,272 | 1/1968 | Grosse | 83/198 |
| 3,590,674 | 7/1971 | Maeda | 83/694 X |
| 3,651,566 | 3/1972 | Kincaid et al. | 83/383 X |
| 3,750,509 | 8/1973 | Kruse | 83/552 X |

FOREIGN PATENT DOCUMENTS 2838714  3/1979  Fed. Rep. of Germany ............. 83/382

Primary Examiner—J. M. Meister
Attorney, Agent, or Firm—Cushman, Darby & Cushman

[57] ABSTRACT

A shearing assembly and method of effecting shearing utilizing the same. Any tendency of further the edges of steel stock being cut to roll is eliminated by providing a male die cutting blade (which cooperates with a female die) having a pair of shelf members, one associated with each cutting blade side face, for engaging the edge of material being sheared during the shearing operation. An actuator element is operatively connected to the male die for moving the cutting blade in a given linear direction, the rolling preventing being accomplished by providing a control structure for positively controlling the length of the stroke of the actuator element and attached cutting blades so that at the limit of travel of the cutting blade in the given linear direction the shelf members are spaced apart from the female die a distance corresponding to the thickness of material being sheared. A plurality of die groups are mounted on a rotating wheel. The wheel has an open side and any of the materials severed during cutting passes through a chute to the open wheel side so that it moves away from interfering engagement with the male and female dies. The male and female die groups are readily releasably mounted to the wheel, and rotate into operative engagement with the actuating element. The male dies will not become detached from the male-female die groups during rotation of the wheel because of particular stop members associated therewith.

20 Claims, 14 Drawing Figures

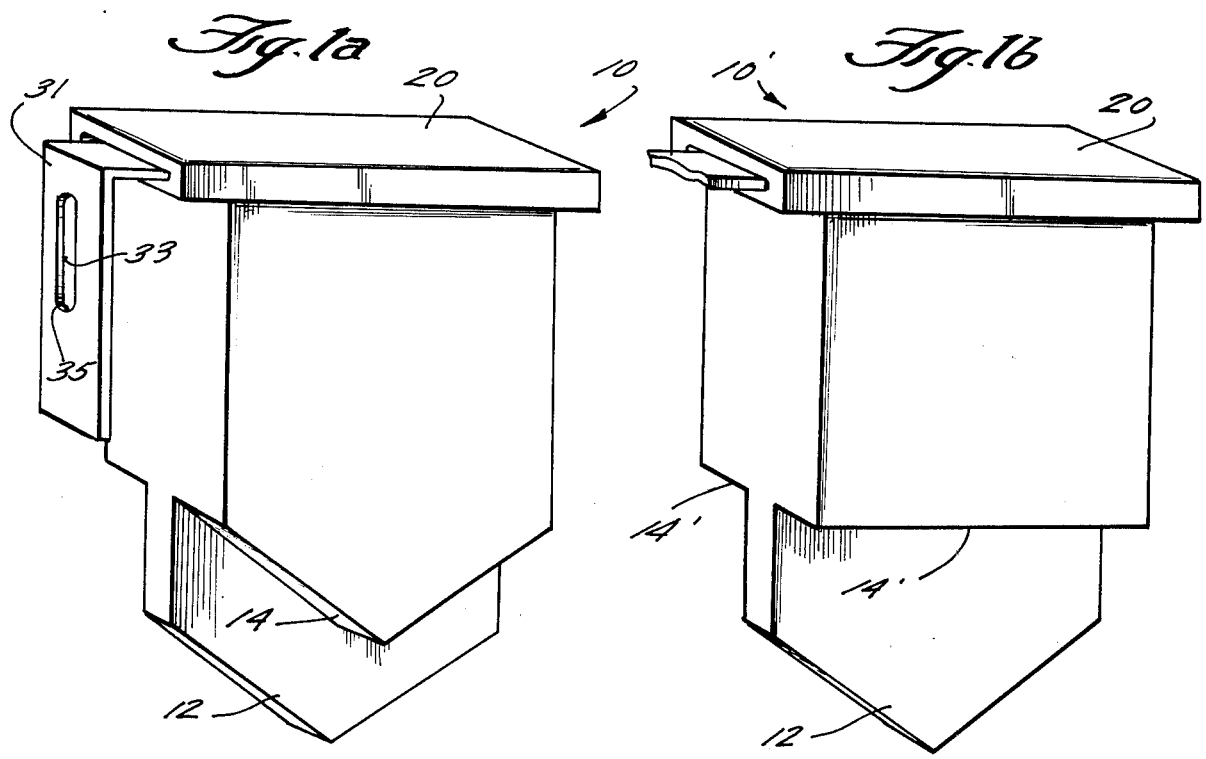
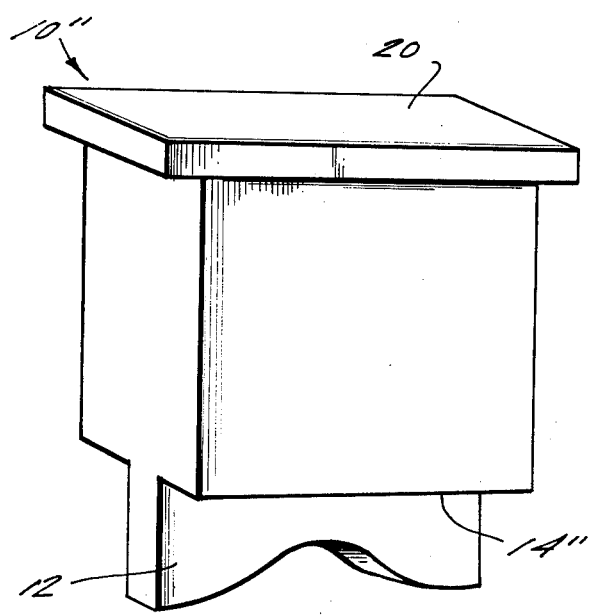
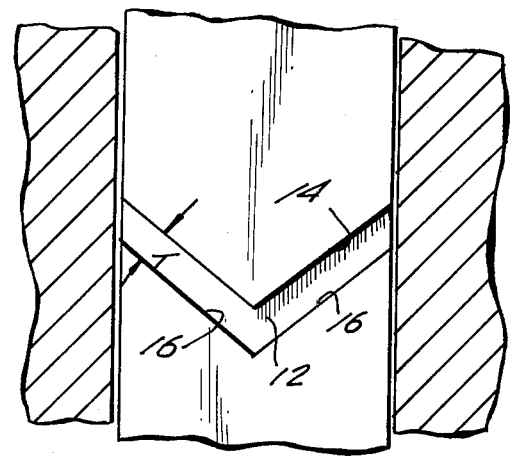

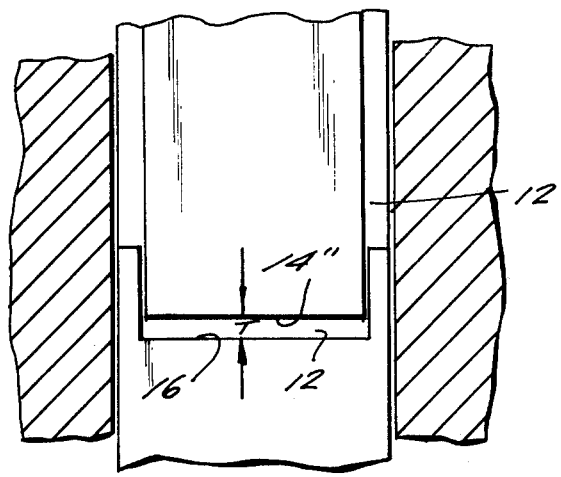
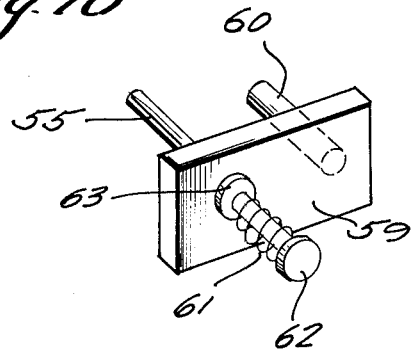
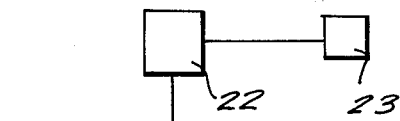
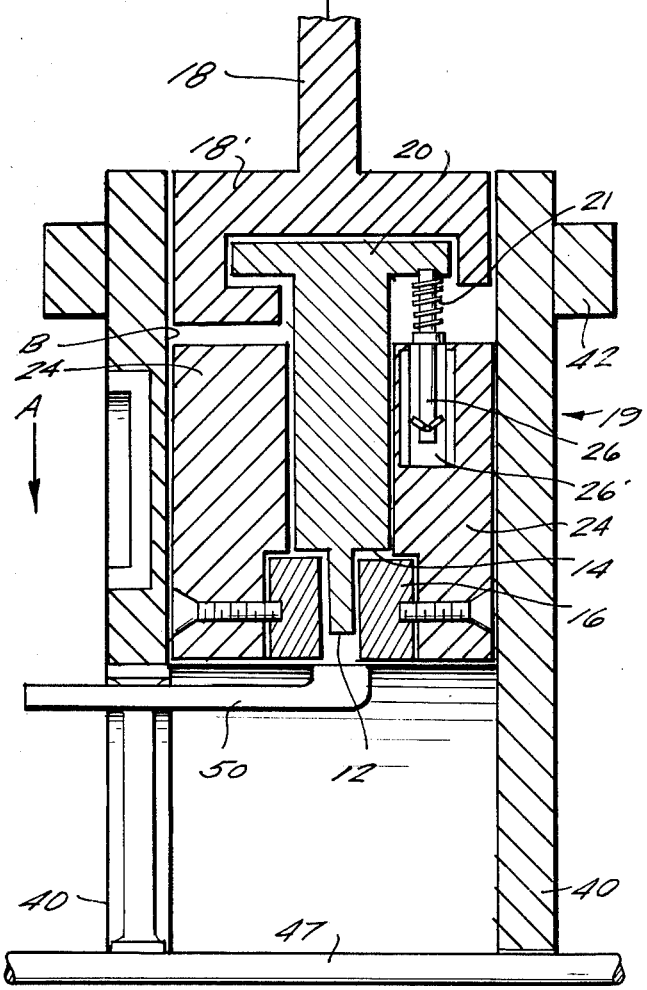

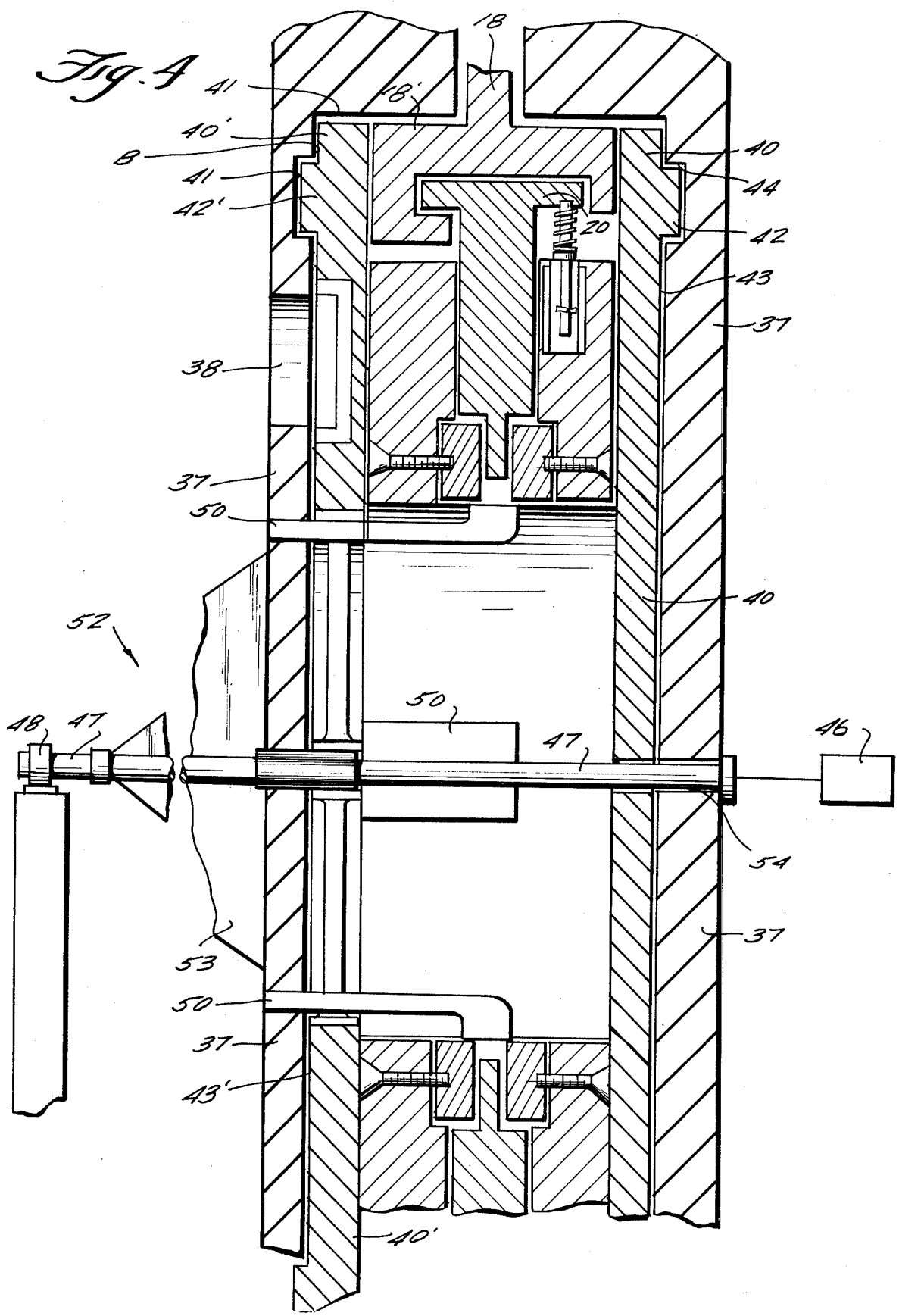

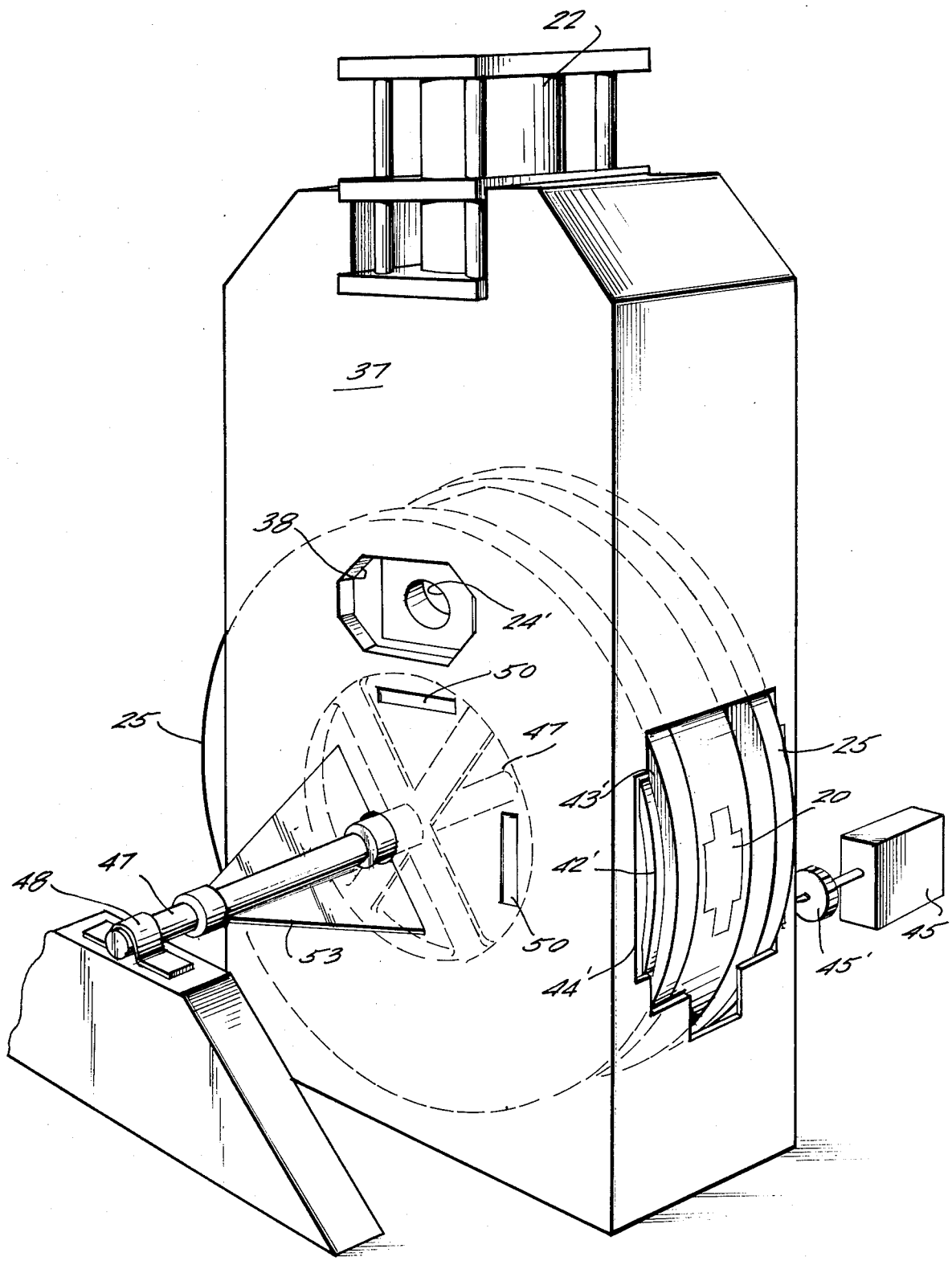

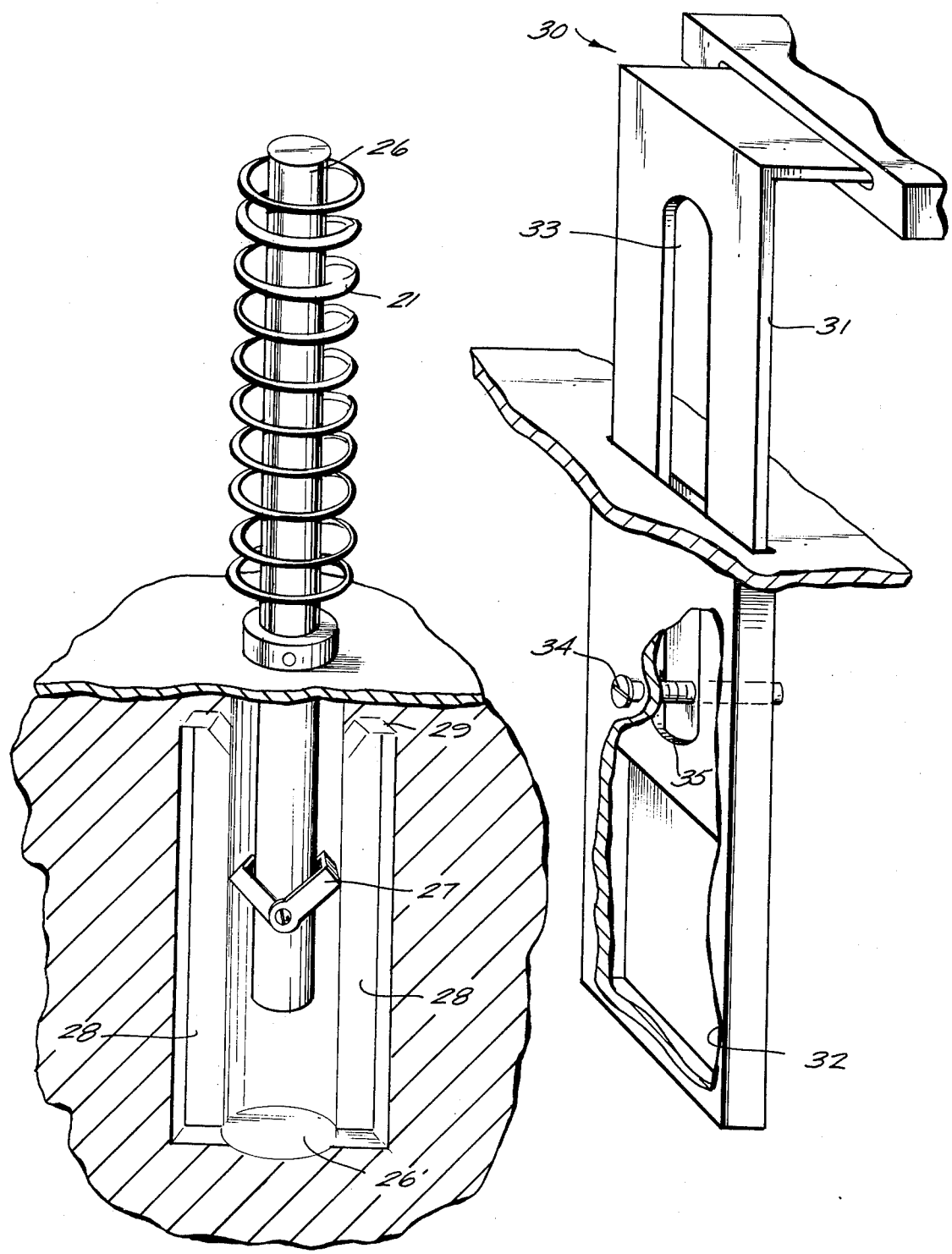

STEEL STOCK CUTTING

BACKGROUND AND SUMMARY OF THE INVENTION

The invention relates to a method and assembly for cutting a wide variety of sheet metal stock, such as angle irons, square tubing, round tubing and bars, channels, flat bars, H-beams, T-beams, and the like.

In the shearing of steel stock, under some circumstances the edges of the stock being cut tend to roll during the cutting operation, providing an end product that is not entirely satisfactory. According to the present invention, a method and structure are provided which positively prevents such rolling in a simple and efficient manner. Cooperating male and female dies are utilized, the male die including a cutting blade with a shelf member provided on each face of the cutting blade for engaging the edges of the material being sheared. The cutting blade is moved through the metal piece being cut so that the shelf members engage the edges of the metal piece sheared by the cutting blade. The stroke of the male die with respect to the female die is positively controlled so that the shelf members and female die are spaced apart a distance corresponding to the thickness of the metal piece being cut when the stroke is completed. Thus, the rolling of the edges is prevented.

Since it is desirable to be able to cut a wide variety of different types of steel stock utilizing the same basic actuating mechanism, it is desirable to mount a plurality of male-female die groups so that a selected group can readily be moved into place in cooperation with an actuating element, the steel stock being fed to the selected die group. According to the present invention, a plurality of die groups are mounted around the perimeter of a rotatable wheel, and radial bores formed in the wheel. Each die group is readily removable from its respective bore by merely pulling a pair of spring-pressed dogs against the bias of the springs, the dogs preventing movement of the die group out of its respective bore in one position, and allowing relative movement therebetween in the released position. Each male-female die group has a disposal chute associated therewith leading to an opened central portion on one side of the wheel containing the dies so that any material severed from the stock during shearing is moved away from the male and female dies. Suitable stop means are associated with the male dies to prevent them from moving out of operative association with the female dies during rotation of the wheel containing the dies.

It is the primary object of the present invention to provide an improved steel stock cutting method and assembly. This and other objects of the invention will become clear from an inspection of the detailed description of the invention, and from the appended claims.

BRIEF DESCRIPTION OF THE DRAWINGS

FIGS. 1a-1c are perspective views of exemplary male dies utilizable in practicing the present invention;

FIGS. 2a and 2b are side views showing the relative positions between two exemplary embodiments of male and female die members at the end of a shearing stroke;

FIG. 3 is a side cross-sectional detailed view showing to cooperation between the male and female dies and an actuating element therefor;

FIG. 4 is a side view partly in cross-section and partly in elevation showing a wheel for mounting a plurality of male-female die structures for rotation into operative association with the actuating element;

FIG. 5 is a perspective view of an exemplary complete assembly according to the invention including supporting frame and rotating wheel;

FIGS. 8 and 9 are detailed views showing exemplary stop means for preventing detachment between the male and female dies of a respective male-female die structure; and FIG. 10 is a perspective view of an exemplary component for holding a male-female die structure in place in the rotatable wheel of the assembly.

DETAILED DESCRIPTION OF THE DRAWINGS

Figure 6:
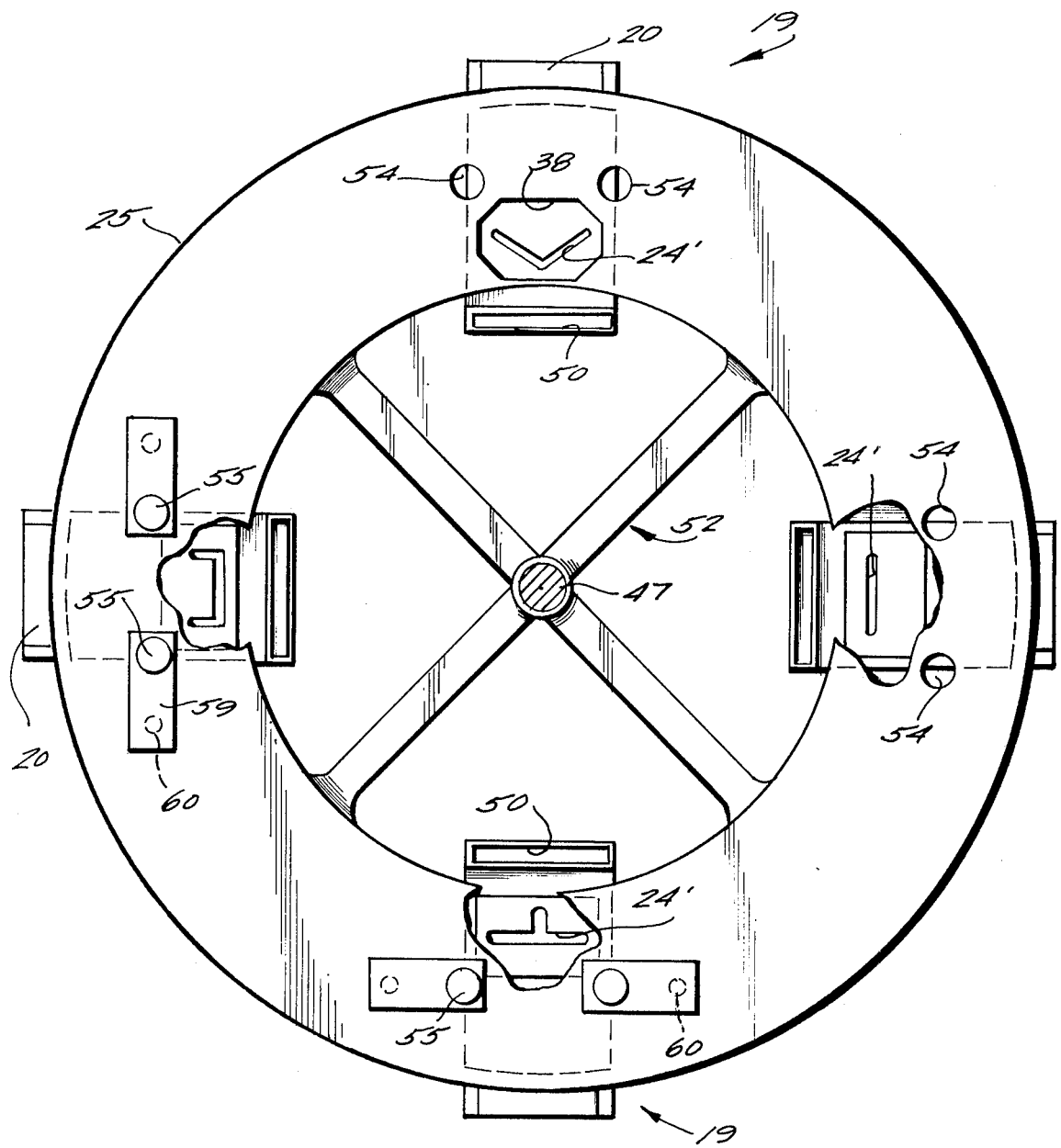
FIG. 6 is a side view of an exemplary die-structure supporting wheel according to the invention.

The basic structure according to the invention comprises relatively movable male and female dies which cooperate together to shear a piece of steel stock, such as angle irons, square tubes, round tubes and bars, channels, H-beams, flat bars, T-beams, or the like. Exemplary male dies 10, 10', and 10" according to the present invention are illustrated in FIGS. 1a-1c. Each male die includes a cutting blade 12 having opposed side faces, and a head 20. The cutting blade 12 cooperates with a female die 16 (see FIGS. 2a, 2b, 3, and 7a in particular) to effect shearing. According to the present invention, means are provided to prevent rolling of the edges of the steel stock being cut. Such means include a pair of shelf members 14, 14', 14" associated with each of the cutting blade 12 side faces, the shelf for engaging the edges of the material being sheared. As illustrated in FIG. 1b, each shelf member 14' may comprise a substantially straight, planar surface substantially perpendicular to the direction A in which the male die is moved during shearing. The shelf members 14' would be used with dies 16 for cutting flat bar, T-beam, and channels (if blade movement is through the closed side as opposed to the open side). The shelf members 14' may be formed narrower than the blade 12, as illustrated in FIG. 2b, for use with channels when the channels are penetrated from the open side as opposed to the closed side, and for use with H-beam. Alternatively, the shelf members 14 may each comprise a pair of substantially straight, planar surfaces, converging to form a point at a central portion of the blade 12, pointing to the direction in which the male die is moved during shearing. Such a configuration would be used for cutting angle irons.

The construction of FIG. 1c is especially suited for shearing channels.

An actuator element 18, which is operatively connected to a hydraulic piston 22 or the like, is connected to the male die 10 for moving the cutting blade 12 in the given linear direction A (see FIG. 3), and control means 23 are provided for positively controlling the length of the stroke of the actuator element 18. For instance, where the power source 22 for the actuator element 18 is a hydraulic piston, a conventional valving means may be utilized as the control 23, which valving means may be manually or automatically adjusted to vary the stroke of the piston 22. The control means 23 can be a numerical controller for automatically controlling the stroke of the actuator element 18 depending upon values fed into the controller. The structures 18, 22, and 23 form part of the means for preventing rolling of the stock edges. The control means 23 positively controls the length of stroke of the actuator element 18 and attached cutting blade 12 so that at the limit of travel of the cutting blade in the given linear direction A the shelf members 14, 14', 14" are spaced apart from the female die 16 a distance T in the linear direction A corresponding to the thickness of the stock being sheared. FIGS. 2a and 2b show such limit of travel positions of an exemplary pair of cutting blades. In FIG. 2a angle iron is being cut, and the shelf 14 is spaced from the female die 16 a distance T corresponding to the thickness of the angle iron being cut. In FIG. 2a, H-beam or channel (from the open side) has been cut, the shelf 14' being spaced a distance T from the female die 16 corresponding to the thickness of the channel or H-beam web.

The operative connection between the actuator element 18 and the head 20 of the male die 10 comprises means for allowing relative rotational movement of the male die with respect to the actuating element while substantial relative movement therebetween in the direction A is not allowed. Such an operative connection is provided by forming the actuating element so that it has a receiving portion 18' (see FIG. 3) for receiving the head 20 therewithin, the receiving portion being generally G-shaped in cross-section so that the head 20 can rotate into and out of operative association therewith.

Figure 7A:
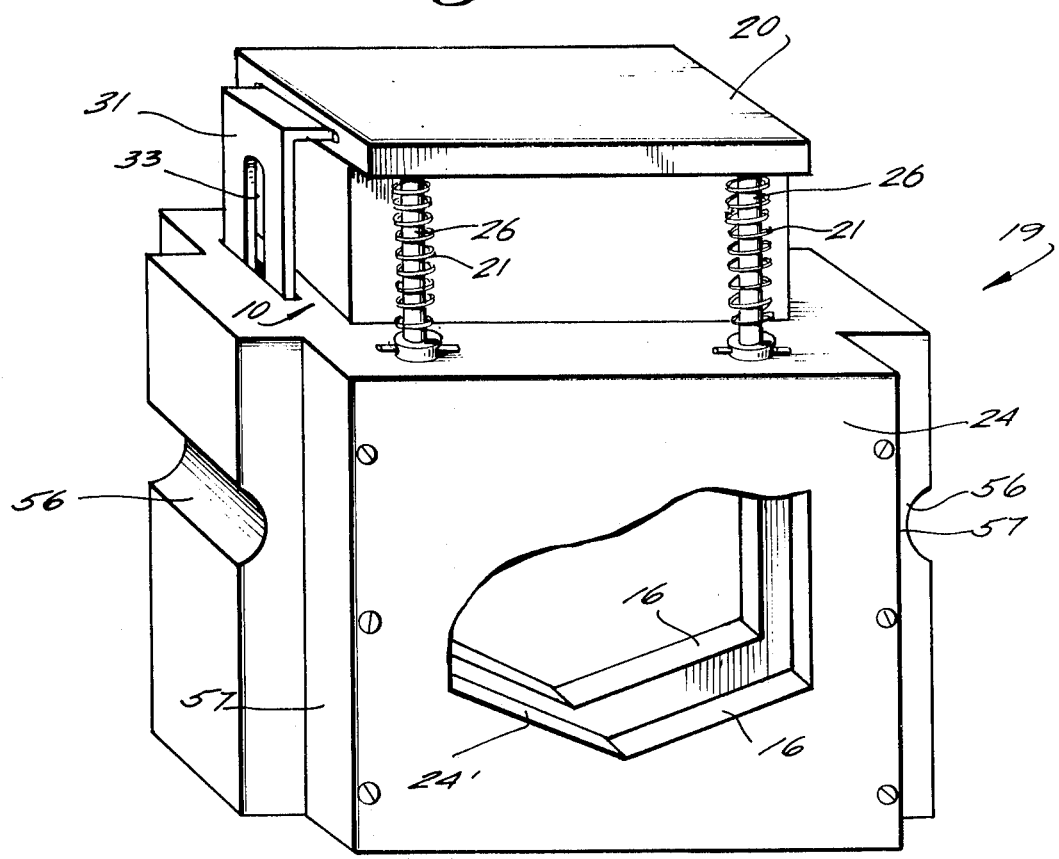
FIGS. 7a and 7b are perspective views of exemplary male-female die distinct removable structures.
Figure 7B:
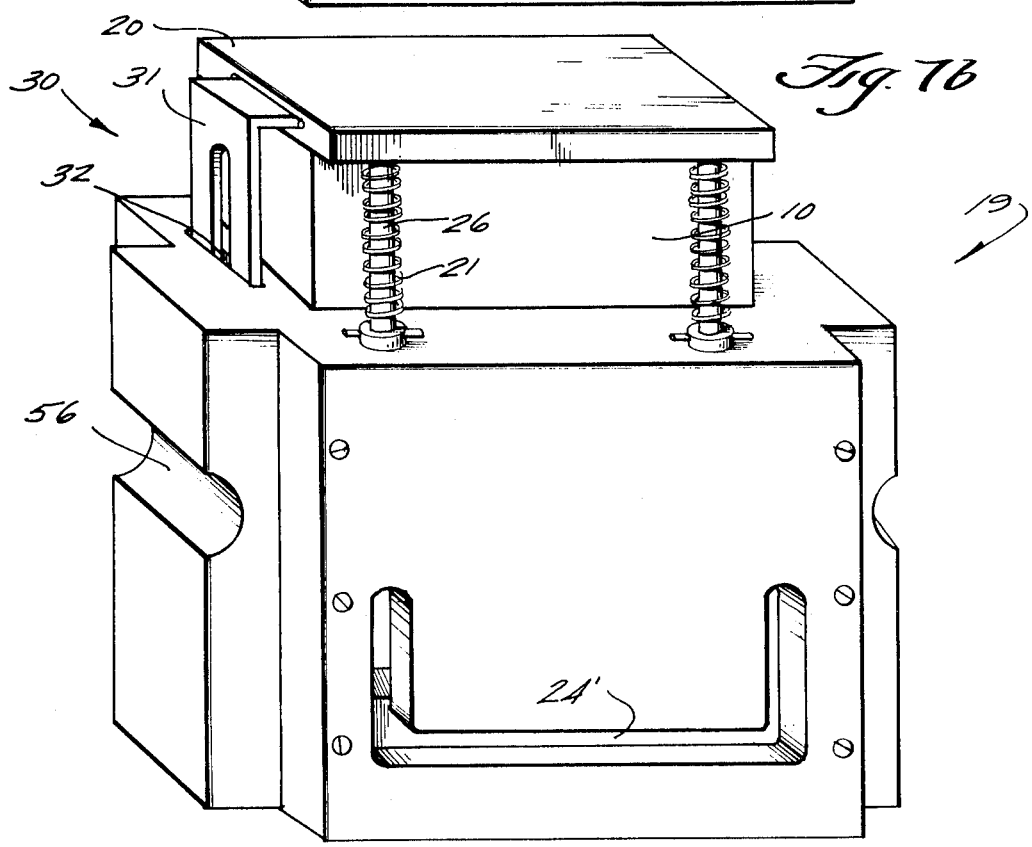

In order to provide for ready selection of suitable dies for shearing different forms of steel stock, it is desirable to mount a plurality of male-female die groups 10, 16 in casings 19 in radial bores B formed around the perimeter of a wheel 25. This can be seen most clearly in FIGS. 4, 5, and 6. Each male-female die structure 19, as seen most clearly in FIGS. 7a and 7b, includes the male 10 and female 16 dies, a casing 24 mounting the female die 16 and having an interior bore in which the male die 10 is slideable, and spring means 21 for biasing the male and female dies apart. The casing 24 has side faces including means defining an opening 24' therein. The opening 24' is shaped to cooperate with the female die 16 for receiving a particular shape of steel stock to be cut. For instance, in FIG. 7b the opening 24' is shaped to receive channel members, while in FIG. 7a (although portions are cut away) it is shaped to receive angle iron.

Each structure 19 also may include releasable stop means for preventing the male die from completely falling out of the casing 24 interior bore during rotation of the wheel 25. Such stop means can be seen most clearly in FIGS. 7a, 7b, 8, and 9. Stop means shown in FIG. 8 include a pin 26 attached to the head 20 and slideable therewith in a bore 26' in the casing 24. A channel 28 is formed on opposite sides of the bore with abutments 29 at the top thereof. A pair of flanges 27 are pivotally mounted to the pins 26 so that they may pivot from a position generally in line with the pin to a position substantially perpendicular to the pin in which position they can engage the channel top abutments 29 to stop further movement thereof. Preferably, the spring means include a coil spring 21 surrounding the pin 26, and preferably a pair of spaced pins 26 are provided on the same side of the head 20 and casing 24. No such structures are provided on the opposite side of the casing 24 and head 20, as can be seen from an inspection of FIG. 3.

Alternatively, or in addition to, the stop means 27, 28 etc, a stop and guide means 30 may be provided. The means 30, shown most clearly in FIGS. 1a, 7a, 7b, and 9, comprises a guide plate 31 operatively mounted to the head 20 of the male die member 10, and slideably received within a guide channel 32 formed in the casing 24 on one end thereof, perpendicular to the sides containing the opening 24'. An elongated opening 33 is formed in the guide plate 31 in a dimension of movement thereof, and a fastener (such as a screw) 34 extends through a casing wall defining the guide channel 32, passing through the elongated opening 33 and providing a stop for the bottom end 35 of the opening 33.

The wheel 25 is mounted for rotation within a frame 37, the frame 37 supporting the power source 22 for the actuator element 18, and including an opening 38 formed therein to allow passage of steel stock to be cut into operative association with a die assembly 19 in operative association with the actuator element 18. The opening 38, as indicated in FIG. 5, may be shaped so that it can receive stock of any conventional configuration, the openings 24' provided in the casing 24 of the die assembly 19 in line with the opening 38 providing for positive guidance of the steel stock depending upon the exact configuration thereof (e.g. angle iron, flat stock, etc.).

The wheel 25 includes a pair of sides 40, 40' which strattle each of the die assemblies 19, and which engage interior channels formed in the frame 37, as indicated at 41 in FIG. 4. The sides 40, 40' each have a circular ring element 42, 42' formed on the outer flat surfaces 43, 43' thereof respectively. The elements 42, 42' cooperate with corresponding channels 44, 44' defined by the frame 37 of the assembly. The means for mounting the wheel 25 further comprises an elongated shaft 47 passing through the center of the wheel 25, and a bushing 48 for the shaft mounted adjacent to, but spaced from, the wheel 25 at one side thereof.

Means for rotating the wheel 25 may take a number of different forms. For instance, a conventional indexing power source 46 can be directly attached to the shaft 47, as indicated schematically in FIG. 4, for rotating the same. Or, as shown schematically in FIG. 5, a drive motor 45 having a driven gear 45' associated therewith may operatively engage the ring 42, which can have gear teeth formed on the periphery thereof, which gear teeth also cooperate with gear teeth formed around the periphery of the channel 44.

The side 40' of the wheel 25 comprises an open center portion 52. Associated with each die assembly 19, and operatively affixed to the wheel 20, are means for defining a chute 50 for directing any piece of the metal being sheared that is severed during shearing as a result of the action between the male and female dies to the open center portion 52 so that it moves out of potential interfering relationship with the dies. The open side 52 of the wheel 25 may be defined in part by the gussetts 53 which surround the shaft 47 and assist in interconnecting the shaft 47 to the wheel 25 when the power source 46 is used to rotate the wheel 25. In situations where the power gear 45' rotates the wheel 25, the gussetts 53 merely provide a bearing for the shaft 47, another bearing also being provided at 54 by the frame 37.

The die assemblies 19 are preferably mounted releasably within the wheel 25 so that the particular die assemblies 19 can be readily changed. Such releasable mounting means comprise a pair of bores associated with each radial bore B for a die assembly 19 that are parallel to the axis of rotation of the wheel 25, and intersect spaced edges of the radial bore. Such parallel bores are illustrated at 54 in FIG. 6 (top and right die assemblies 19). The mounting means further comprise a pair of channels 56 (see FIGS. 7a and 7b in particular) formed on opposite end faces 57 of each casing 24, the channels 56 being perpendicular to a plane containing the cutting blade 12, and shaped and dimensioned to correspond to the wheel bores 54. A pair of spring pressed dogs 55 (see FIGS. 6 and 10) are mounted on the wheel 25 associated with each die assembly 19 position, the dogs being biased into a position wherein they are received by the bores 54 and channels 56, and are movable against the spring bias out of interfering relationship with the channels 56 to allow removal of a casing 24 with which they are associated from its respective radial bore. If desired, the dogs 55 may be mounted on plates 59 which are pivoted by posts 60 to the wheel 25. When the dogs 25 are retracted against spring bias so that they do not extend past the bottom of the plate 59, the plate 59 can be pivoted about pin 60 to a position wherein the dog 55 in no longer in alignment with the bore 54, at which time it can be released. Then the plate 59 may merely be pivoted into position wherein the dog 55 aligns with its respective bore 54, and it will then automatically be pressed into the bore 54 by the action of spring 61 acting between the head 62 which is mounted to the plate 59, and a collar 63 formed on the dog 55.

OPERATION

A plurality of die assemblies 19 are mounted in radial bores in the wheel 25, the particular die assemblies 19 selected corresponding to the particular types steel stock to be cut. For instance, with reference to FIG. 6, from the top going clockwise die assemblies are provided for cutting angle iron, flat stock, T-beam, and channels. Each assembly is mounted in the wheel 25 by inserting the casing 24 in a respective radial bore B (see FIG. 3) so that the bores 54 and channels 56 are aligned, and then pivoting plates 59 about pivots 60 until the dogs 55 thereof are in alignment with the bores 54, at which time the springs 61 will move the dogs into interlocking engagement with the bores 54 and channels 56. By operating the motor 46 (or alternatively the motor 45) the desired die assembly is then rotated into place in alignment with opening 38 in frame 37.

The particular steel stock shape to be cut is then fed into opening 38 in frame 37, and into the corresponding opening 24' of the die assembly 19 aligned therewith. The steel stock may be fed automatically to the opening 38 by any conventional conveyor mechanism, or by the conveying mechanism disclosed in copending application Ser. No. 910 filed Jan. 3, 1979 and entitled "UNIVERSAL CONVEYOR" (the disclosure of which is hereby incorporated by reference herein). The control mean 23 is manually or automatically adjusted to control the stroke of the actuator element 18 depending upon the thickness of the material being cut, and then the power source 22 is activated. Activation of the power source 22 causes actuator 18 to engage head 20 and move blade 12 through the piece of metal being cut, the shelf means 14, 14' 14", etc engaging the edges of the material being sheared to prevent rolling thereof, and the stroke being limited so that the shelf means are spaced a distance T from the female die 16 at the end of the stroke.

Any material severed from the stock being cut during shearing passes out through the chute 50 associated with the particular die mechanism 19 being utilized, and falls out through open side 52 of the wheel 25. The spring means 21 automatically returns the head 20 to its initial position, the stock is fed out, and the assembly is ready to accept the next piece. The particular supporting arrangement for the wheel (40, 42,44, etc.) transfers the force of shearing to the entire frame 37 to minimize localized stresses.

When desired, the die assemblies 19 can be removed and the female dies turned so that different cutting edges are provided to prevent deleterious effects due to wear.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent assemblies and methods.

What is claimed is:

1. A shearing assembly comprising a female die;
a male die including a cutting blade having a pair of said faces; and
means associated with said cutting blade for preventing rolling of edges of material being sheared, said means comprising a pair of shelf members, one associated with each of said cutting blade side faces, for engaging the edges of material being sheared, each shelf member comprising a pair of substantially straight, planar surfaces, converging to form a point pointing to a direction in which the male die is moved during shearing.

2. An assembly as recited in claim 1 further comprising an actuator element operatively connected to said male die for moving said male die cutting blade in a given linear direction; and wherein said means for preventing rolling further comprises control means for positively controlling the length of stroke of said actuator element and attached cutting blade so that at the limit of travel of said cutting blade in said given linear direction said shelf members are spaced apart from said female die a distance corresponding to the thickness of material being sheared.

3. An assembly as recited in claim 2 wherein said operative connection between said actuating element and said male die comprises means for allowing relative rotational movement of said male die with respect to said actuating element while substantial relative movement therebetween in said given linear direction is not allowed.

4. A shearing assembly comprising
a frame including an opening therein for receipt of material to be cut of a predetermined shape, such as angle iron, channels, H-beam, flat stock, T-beam or the like;
a plurality of male and female die assemblies, each including a distinct removable structure including a casing mounting the female die and having an interior in which the male die is slideable, the casing having a pair of side faces substantially parallel to the faces of a slideable cutting blade associated with the male die and the casing side faces including means defining an opening therein for cooperation with frame opening for receiving material to be cut of a predetermined shape;
a rotatable wheel for receiving said plurality of die structures around the perimeter thereof in radial bores formed therein;

means for mounting said wheel for rotation about an axis perpendicular to the direction of movement of said male dies with respect to said female dies, and within said frame;

said wheel having an open side thereof and said frame having an opening corresponding to said wheel open side;

a single actuating element mounted on said frame for cooperation with a male die of one of said male and female die structures, which is rotated into operative association with said actuating member;

means for rotating said wheel to selectively bring a desired male-female die structure into operative association with said actuating element; and each male and female die structure further comprising means defining a chute for directing any piece of the material being sheared that is severed during shearing to said wheel side open center portion, so that it moves out of potential interfering relationship with said dies.

5. An assembly as recited in claim 4 wherein said means for mounting said wheel comprises an elongated shaft passing through the center of said wheel, a bushing for said shaft mounted adjacent to, but spaced from, said wheel at one side thereof, and bearing means formed on the sides of said wheel for cooperating with bearing means formed in said frame.

6. An assembly as recited in claim 4 further comprising means for releasably mounting said casing to said wheel, said means comprising a pair of bores parallel to said axis of rotation formed in said wheel intersecting spaced edges of each of said radial bores; a pair of channels formed on opposite end faces of each of said male-female die structures, said channels perpendicular to a plane containing said cutting blade, and shaped and dimensioned to correspond to said wheel bores parallel to said axis of rotation; and a pair of spring-pressed dogs mounted with said wheel and biased into a position wherein they are received by said channels and said wheel bores parallel to the axis of rotation, and are movable against the spring bias out of interfering relationship with the channels to allow removal of said structure from said radial bore.

7. An assembly as recited in claim 4 wherein said male die is formed with a head, and wherein said actuating member comprises a receiving portion for receiving said head therewith, said receiving portion being generally G-shaped in cross-section, and allowing relative rotational movement of said male die with respect to said actuating element while substantial radial movement therebetween is not allowed.

8. An assembly as recited in claim 4 further comprising releasable stop means for preventing said male die from becoming detached from said male-female structure during rotation of said wheel, said stop means comprising a pin attached to a head portion of said male die member and slideable therewith; a bore in said structure receiving said pin and including a channel formed on opposite sides thereof with abutments at the top thereof; a pair of flanges; and means for pivotally mounting said flanges to said pin so that they may pivot from a position generally in-line with said pin to a position substantially perpendicular to said pin to engage said channel top abutments.

9. An assembly as recited in claim 1 wherein said cutting blade converges to a point at a central portion thereof, pointing in a direction in which said male die is moved during shearing.

10. A shearing assembly comprising a female die;

a male die including a cutting blade having a pair of side faces;

means associated with said cutting blade for preventing rolling of edges of material being sheared, said means comprising a pair of shelf members, one associated with each of said cutting blade side faces, for engaging the edges of material being sheared;

an actuator element operatively connected to said male die for moving said male die cutting blade in a given linear direction, the operative connection between said actuating element and said male die comprising means for allowing relative rotational movement of said male die with respect to said actuating element while substantial relative movement therebetween in said given linear direction is not allowed; and wherein said means for preventing rolling further comprises control means for positively controlling the length of stroke of said actuator element and attached cutting blade so that at the limit of travel of said cutting blade in said given linear direction said shelf members are spaced apart from said female die a distance corresponding to the thickness of material being sheared.

11. An assembly as recited in claim 10 wherein said shelf members each comprise a substantially straight, planar surface substantially perpendicular to a direction in which the male die is moved during shearing.

12. An assembly as recited in claim 11 wherein said shelf members are narrower than said blade side faces with which they are associated.

13. An assembly as recited in claim 10 wherein said operative connection between said actuating element and male die comprises said male die being formed with a head, and said actuating element comprising a receiving portion for receiving said head therewithin, said receiving portion being generally G-shaped in cross-section.

14. An assembly as recited in claim 10 wherein a plurality of male and female die groups are mounted in a wheel, and wherein means for mounting said wheel for rotation about an axis perpendicular to said given linear direction are provided, and further comprising means for rotating said wheel about its axis to selectively bring a respective one of said male and female die groups into operative association with said actuating element.

15. An assembly as recited in claim 14 wherein said wheel comprises an open center portion on at least one side thereof, and wherein each male and female die group further comprises means defining a chute for directing any piece of the material being sheared that is severed during shearing to said open center portion so that it moves out of potential interfering relationship with said dies.

16. An assembly as recited in claim 14 wherein said means for mounting said wheel comprises an elongated shaft passing through the center of said wheel, a bushing for said shaft mounted adjacent to but spaced from, said wheel at one side thereof; a frame surrounding said wheel and including an opening therein for allowing material to be sheared to be fed into operative association with said dies; and bearing means formed on the sides of said wheel for cooperating with bearing means formed in said frame.

17. An assembly as recited in claim 14 wherein each male and female die group is a distinct removable structure including a casing mounting said female die and having an interior bore in which said male die is slidable; said casing having a pair of side faces substantially parallel to the faces of said cutting blade, and said casing side faces including means defining an opening therein shaped to cooperate with said female die for receiving material to be cut of a predetermined shape, such as angle iron, channels, H-beam, flat stock, T-beam, or the like; said male die including a head for engaging said actuating element extending away from said casing; spring means disposed between said head and said casing for biasing said male and female dies apart; releasable stop means for preventing said male die from completely falling out of said casing interior bore; and means for releasably mounting said casing to said wheel.

18. An assembly as recited in claim 17 wherein said means for releasably mounting said casing to said wheel comprises a radial bore formed in said wheel for receiving said casing; a pair of bores parallel to said axis of rotation formed in said wheel intersecting spaced edges of said radial bore; a pair of channels formed on opposite end faces of said casing said channels perpendicular to a plane containing said cutting blade, and shaped and dimensioned to correspond to said wheel bores parallel to said axis of rotation; and a pair of spring-pressed dogs mounted with said wheel and biased into a position wherein they are received by said channels and said wheel bores parallel to said axis of rotation, and are movable against the spring bias out of interfering relationship with said channels to allow removal of said casing from said radial bore.

19. An assembly as recited in claim 17 wherein said stop means comprise a pin attached to said head and slideable therewith; a bore in said casing receiving said pin and including a channel formed on opposite sides thereof with abutments at the top thereof; a pair of flanges; and means for pivotally mounting said flanges to said pin so that they may pivot from a position generally in-line with said pin to a position substantially perpendicular to said pin to engage said channel top abutments.

20. An assembly as recited in claim 17 wherein said stop means comprise a guide plate operatively mounted to said male die member head and slideably received within a guide channel formed in said casing; an elongated opening formed in said guide plate in the dimension of movement thereof; and a fastener extending through a casing wall defining said guide channel and passing through said elongated opening.

* * * * *